Nov. 29, 1949     P. C. NEILSEN     2,489,803
TIRE RASP

Filed Sept. 27, 1947     2 Sheets-Sheet 1

INVENTOR.
Peter C. Neilsen
BY
Zahl & Gutzbaugh
Attorneys

Nov. 29, 1949 P. C. NEILSEN 2,489,803
TIRE RASP
Filed Sept. 27, 1947 2 Sheets-Sheet 2
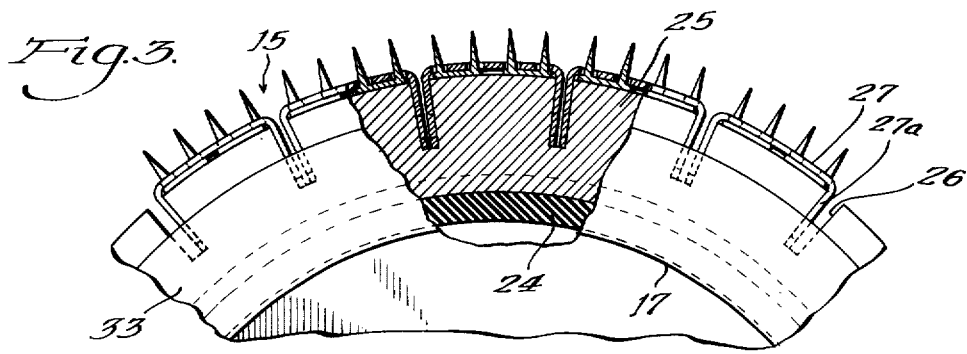
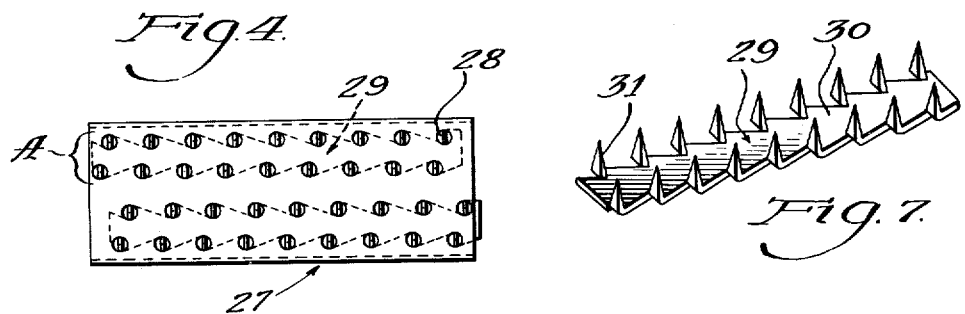
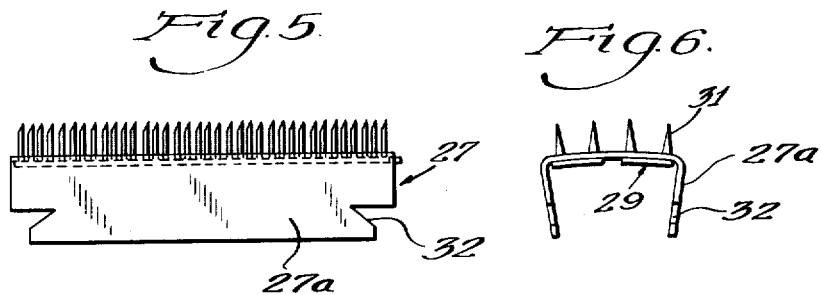
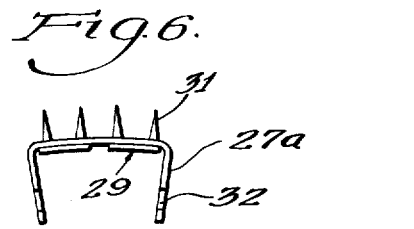
INVENTOR.
Peter C. Neilsen
BY
Zabel & Gritzbaugh
Attorneys Patented Nov. 29, 1949

2,489,803

UNITED STATES PATENT OFFICE 2,489,803

TIRE RASP

Peter C. Nellsen, Chicago, Ill.

Application September 27, 1947, Serial No. 776,445

4 Claims. (Cl. 29—78)

The present invention is concerned with rasps and particularly with tire rasps of the rotary type. The invention is intended primarily to provide an effective sturdy tire rasp that is simple to assemble and one wherein the operation of replacing worn out or broken rasp teeth is simple and can be accomplished rapidly without requiring the use of holding fixtures and the like to hold the various parts while the teeth are being inserted.

The foregoing constitute some of the principal objects and advantages of the present invention, others of which will become apparent from the following description and the drawings, in which Fig. 1 is a side elevational view of a completely assembled rasp embodying the present invention;

Fig. 3 is an enlarged fragmentary side elevational view corresponding to Fig. 1 but with a portion shown broken away and shown in section;

Fig. 4 is a plan detail view of one of the toothed element supporting members shown with the toothed elements in place;

Fig. 5 is a side elevational view of the assembly shown in Fig. 4;

Fig. 6 is an end elevational view of the assembly illustrated in Figs. 4 and 5; and Fig. 7 is a perspective view of one of the toothed elements.

For purposes of illustration a single embodiment only of the present invention is shown and described herein. It is recognized, of course, that modifications will occur to the man skilled in the art and it is intended that such modifications may be made without departing from the scope of the invention.

Figure 1:
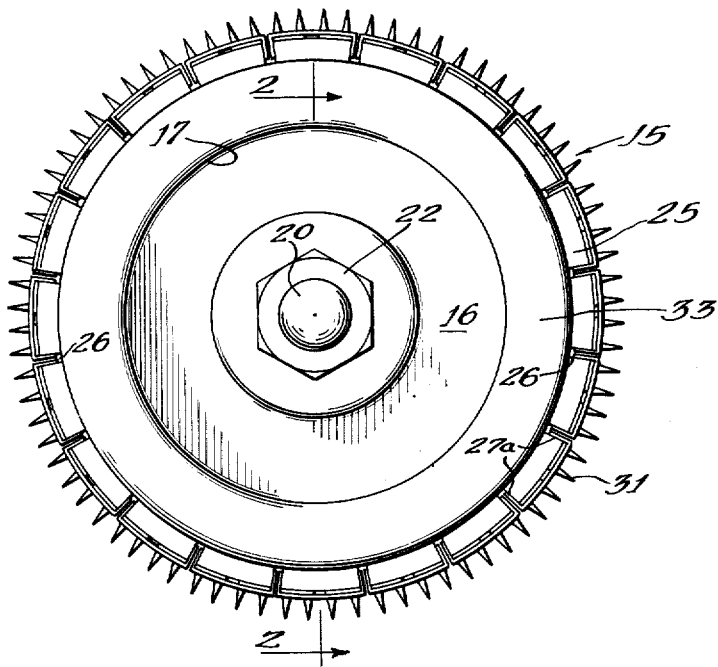
Figure 2:
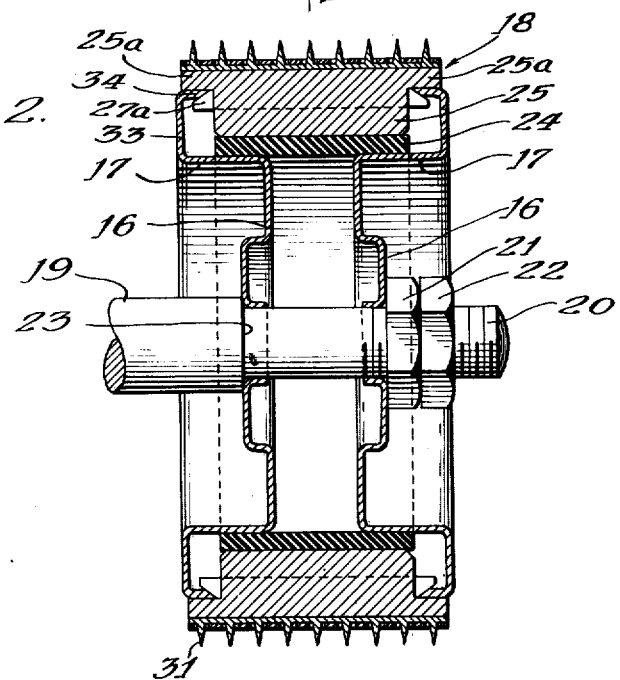
Fig. 2 is a transverse sectional view taken through the rasp along the line 2—2 of Fig. 1.

Referring to the drawings and particularly to Figs. 1 and 2 the invention is illustrated in the form of a tire rasp generally indicated at 15 that comprises generally a pair of webbed side members 16 provided with annular flanges 17 that form bearing surfaces upon which is mounted an annular band assembly 18 that forms the peripheral face of the rasp. The webbed side members 16 are mounted on an arbor 19 that is threaded on its free end as at 20 to receive a nut 21 and a locking nut 22. One of the webbed side members 16 is disposed against a shoulder 23 on the arbor 19. The band assembly 18 comprises an inner cushion ring 24 of rubber or any other suitable resilient material that rests directly upon the faces of flanges 17. Mounted on this cushion 24 is a toothed element backing ring 25 that is provided with outwardly extending flange portions 25a at its outer periphery.

The backing ring 24 is grooved transversely as at 26 (see Fig. 3), the grooves being uniformly spaced in parallel relationship about the outer peripheral face of the backing ring 25.

Referring particularly to Fig. 3 a plurality of toothed element supporting members 27 in the form of channels having downwardly projecting legs 27a are mounted on the outer surface of the backing ring 25 with the legs 27a projecting downwardly into the transversely extending grooves 26. Each of these supporting members 27 as shown in Fig. 4 is provided with a plurality of apertures 28 arranged in pairs of parallel rows indicated by the bracket A, which rows extend lengthwise along the upper face of the channel support 27. As shown two of such pairs of rows of apertures 28 are provided in each channel member 27 though, of course, this number can be varied. The channel shaped supporting members 27 are disposed in a substantially continuous manner throughout the entire peripheral surface of the rasp 15.

Referring to Fig. 7 a toothed element 29 is provided and comprises an elongated plate-like element 30 that has a plurality of teeth 31 disposed along each of the side edges of the element. These teeth 31 are pointed and all extend in parallel relationship with respect to each other in a direction substantially at right angles to the general plane of the plate-like element 30. The teeth on each side of the plate-like element 30 are spaced at equal distances apart and the teeth along one edge are offset with respect to the corresponding teeth along the other edge of the toothed member 29 so that in effect all of the teeth are staggered with respect to each other. Similarly the apertures 28 in each pair of rows in the channel shaped supporting member 27 are staggered and their spacing and arrangement correspond to the arrangement of the teeth 31. Thus the toothed member 29 is adapted to be placed with its plate-like element 30 against the underneath face of the channel shaped supporting member 27 and with the teeth 31 projecting through the apertures 28. Two of such toothed elements 29 can be inserted into each of the channel shaped supporting members 27 as shown in the drawings. As previously suggested the number of toothed elements 29 to be applied to each channel shaped supporting member 27 can be varied.

Thus an assembly comprising a channel shaped supporting member 27 with its toothed elements 29 in place can very readily be mounted on the backing ring 25 as shown in Fig. 3 with the legs 27a of the supporting member 27 projecting downwardly into a pair of spaced grooves 26. The toothed elements 29 are thereby held between the upper portion of the supporting member 27 and the peripheral face of the backing ring 25. It is obvious that the steps of applying such an assembly to the backing ring 25 involves the very simple operation of merely setting the assembly in place.

Referring now to Fig. 5 each of the downwardly projecting legs 27a of the channel shaped toothed element supporting members 27 is provided with a V-shaped notch 32 adjacent to the lower edge at the opposite ends of each leg.

Referring now to Fig. 2 the flanges 17 of each of the webbed side members 16 of the rasp are provided with upwardly and inwardly disposed flange portions 33 and 34 respectively, the inwardly projecting flange portion 34 being disposed horizontally and in spaced relationship with respect to the previously mentioned flanges 17. When the toothed element supporting members 27 are disposed in place on the backing ring 25 with their downwardly projecting legs 27a extending in the grooves 26 the sides of the legs 27a project beyond the side margins of the backing ring 25 in the region below the flanges 25a on the backing ring. Thus the V-notches 32 project beyond the side faces of the backing ring 25, and are disposed immediately below the flanges 25a. The inwardly turned flanges 34 on the webbed side member 16 are adapted to project into the V-shaped notches 32 and all of the downwardly projecting legs 27a of the channel shaped toothed element supporting member 27. These flanges 34 may be tapered on their free edge to correspond with the slope of the lower side of the V-notches 32 so that these flanges 34 serve as wedges in the V-notches that pull the channel shaped supporting members 27 firmly into place and hold them in this condition. When the assembly has thus been completed the nut 21 is drawn up tight on the threaded end 20 of the arbor 19 and the lock nut 22 locks the assembly in place. Thus all of the channel shaped supporting members 27 are firmly locked in place on the backing ring 25 and the toothed elements 29 are firmly held in the manner previously described.

The rasp is now in condition for use so that upon rotation of the arbor 19 the rasp is rotated. A tire casing or the like can now be brought into engagement with toothed surface of the rasp for the purpose of preparing the tire surface for vulcanizing, recapping or the like.

To disassemble the device in the event certain of the teeth become worn out or broken the nuts 21 and 22 are removed from the arbor 19 so that the rasp can be disassembled upon removal of one of the webbed side members 16, with the resulting removal of the locking flange 34 from its engagement with the V-shaped notches 32 at one side of the legs of the channel shaped supporting members 27 the channel shaped members are released so that one or more containing the faulty teeth can be slid out for replacement of the toothed element containing the faulty teeth. A new toothed element can then be inserted and the channel shaped member quickly replaced and locked in the manner previously described. This all can be accomplished in a very short period of time without requiring special tools or fixtures to make this replacement.

I claim:

1. A rasp of the class described comprising a drum including a peripheral band portion, transversely disposed grooves in the band portion spaced throughout the circumference of the band portion, a plurality of toothed element supports mounted on the band and each being in the form substantially of a channel member having downwardly projecting legs spaced apart to correspond to the spacing of the grooves, and a web portion provided with a plurality of apertures therethrough, and tooth elements having teeth projecting through the apertures, each support being adapted to straddle the distance between two adjacent grooves with one leg disposed in a groove, and locking means engaging the supports to fix the latter on the band.

2. A rasp of the class described comprising a drum including a peripheral band portion, transversely disposed grooves in the band portion spaced throughout the circumference of the band portion, a plurality of toothed element supports mounted on the band and each being in the form substantially of a channel member having downwardly projecting legs spaced apart to correspond to the spacing of the grooves, and a web portion provided with a plurality of apertures therethrough, and tooth elements having teeth projecting through the apertures, each support being adapted to straddle the distance between two adjacent grooves with one leg disposed in a groove, and a flange on the side members engaging the toothed element supports to lock the latter in place.

3. A rasp of the class described comprising a drum including a peripheral band portion, transversely disposed grooves in the band portion spaced throughout the circumference of the band portion, a plurality of toothed element supports mounted on the band and each being in the form substantially of a channel member having downwardly projecting legs spaced apart to correspond to the spacing of the grooves, and a web portion provided with a plurality of apertures therethrough, and tooth elements having teeth projecting through the apertures, each support being adapted to straddle the distance between two adjacent grooves with one leg disposed in a groove, each of the toothed element supports having locking slots adjacent to each end thereof, and a flange on each of the side members engaging the locking slots on the corresponding sides of the toothed element supports to lock the supports in place.

4. A rasp of the class described comprising a drum, transversely disposed grooves in the peripheral surface of the drum spaced circumferentially thereabout, a plurality of toothed element supports mounted on the drum, each being in the form substantially of a channel member having downwardly projecting legs spaced apart to correspond to the spacing of the grooves, and a web portion provided with a plurality of apertures therethrough, and toothed elements having teeth projecting through the apertures, each support being adapted to straddle the distance between two adjacent grooves with one leg disposed in a groove, and locking means engaging the supports to fix the latter on the drum.

PETER C. NEILSEN.

REFERENCES CITED

The following references are of record in the file of this patent:

UNITED STATES PATENTS

| Number | Name | Date |
| --- | --- | --- |
| 1,395,309 | Taber | Nov. 1, 1921 |
| 1,829,531 | Neilsen | Oct. 27, 1931 |
| 2,035,802 | George | Mar. 31, 1936 |
| 2,079,995 | Hodgkins | May 11, 1937 |
| 2,365,462 | Fontaine | Dec. 19, 1944 |
| 2,416,203 | Neilsen | Feb. 18, 1947 |